United States Patent
Rider et al.

(10) Patent No.: US 6,304,314 B1
(45) Date of Patent: Oct. 16, 2001

(54) DETERMINATION OF THE SPEED OF MOVEMENT OF AN IMAGE-BEARING SHEET

(75) Inventors: Christopher B. Rider, New Malden; David A. Skye, Harpenden, both of (GB)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/464,430

(22) Filed: Dec. 16, 1999

(30) Foreign Application Priority Data

Dec. 24, 1998 (GB) .................................................. 9828440

(51) Int. Cl.[7] ........................... G03B 27/32; G03B 27/52; G03B 27/00
(52) U.S. Cl. ............................... 355/27; 355/40; 355/77; 355/407
(58) Field of Search ............................... 355/27–29, 407, 355/77, 40; 396/612; 271/3.14–3.15, 9.02; 358/496, 498

(56) References Cited

U.S. PATENT DOCUMENTS

| 3,554,109 | 1/1971 | Street et al. | 95/89 |
| 4,506,969 | * 3/1985 | Baker | 354/298 |
| 4,603,956 | * 8/1986 | Baker | 354/298 |
| 5,452,039 | * 9/1995 | Michiels et al. | 354/298 |

* cited by examiner

Primary Examiner—David M. Gray
Assistant Examiner—Hung Henry Nguyen
(74) Attorney, Agent, or Firm—Frank Pincelli

(57) ABSTRACT

Optical scanning of a moving sheet of image-bearing material is carried out in a stand-alone apparatus. No drive is provided for the sheet in the scanning apparatus, and the sheet accelerates therethrough under its own momentum and under its own weight. Transmittance scans from an optical sensor are obtained at a uniform frequency, and are analysed to determine the final speed of the sheet. Computation then allows the data to be corrected such that the detected transmittance can be related to the actual area of the sheet under acceleration. The transmittance of the sheet is then combined with its measured area to determine the amount of image present on the sheet. The invention finds application in photoprocessing apparatus, and a signal dependent on the amount of image present on the sheet and its area is sent back to the photoprocessor to control the amount of replenishment chemicals added to the processing tanks.

10 Claims, 4 Drawing Sheets

DETERMINATION OF THE SPEED OF MOVEMENT OF AN IMAGE-BEARING SHEET

FIELD OF THE INVENTION

This invention relates to determination, as a function of time, of the speed of movement of a sheet bearing an image. In particular, the invention relates to measurements of a sheet of photographic material having an image bearing portion and a non-image bearing portion.

Although the invention finds particular application in respect of an image-bearing sheet of photographic material, and especially one having black and white, high contrast images, for example of the kind used in graphic arts, it is generally applicable to sheet material bearing any kind of image including color images, including but not limited to those formed on silver halide film and paper, and to images formed using polymers, dyes, inks, or toners.

The term "sheet" is to be understood as encompassing a substantially two-dimensional shape not only of discrete square or other low aspect ratio, but also of elongate, generally rectilinear, shape, thus including, for example, a web or a roll of photographic material.

For convenience, but not by way of limitation, reference will be made to the application to the application of the invention to photographic sheet material.

BACKGROUND OF THE INVENTION

For the accurate control of a photographic photoprocessing machine, it is necessary to replenish the processing baths to compensate for consumption of the chemicals therein as the photographic material is processed, and thus to maintain the chemical activity of the processing solutions. Improvements in the formulations of the processing solutions, and a desire to reduce the volume of liquid effluent which is produced, have led in recent years to a gradual reduction in the rate and amount of replenishment required. This, in turn, has led to a requirement for increasingly accurate control of the replenishment process. For black and white materials, the volume of replenishment solution required for the developer and the fixer stages of the processing is a function of the area of the material processed and of the amount of developed image on the material. The width of the sheet may be determined in a number of ways. In many graphic arts, that is to say high contrast black and white, processing machines, for example, where a variety of material widths may be used, the area is usually approximately determined by measuring the sheet width and the length by means of microswitches extending across the width of the entrance to the processor that are activated by the passing material. The width is determined by the number of microswitches that are activated, and the length by the time for which the microswitches are activated multiplied by the transport speed of the processor.

Another method of obtaining the width and length, and thus the image area, is to have the image exposing apparatus, for example, an image setter, transmit this information to the processor, as is the case, for example with the Linotype Hell Hercules PRO/Advantage™ image setting system. The processor is then able to use the information from the image setter to enable accurate replenishment and thus to maintain good process control.

U.S. Pat. No. 4,506,969 (Pako Corporation) discloses a film width and transmittance scanner system of a graphic arts film processor in which the transmittance of light through the film is measured along a line or set of parallel lines positioned at a skew angle with respect to the direction of film travel. U.S. Pat. No. 3,554,109 (Logetronics Inc) discloses an image monitoring and control system for determining the optical densities developed in sheets of image-bearing photosensitive material, for controlling the feeding of replenishment chemicals to a film processor.

A preferred method of measuring the width of an image bearing sheet of photographic material, however, is disclosed in our contemporaneously-filed patent application (GB 9828439.1, filed Dec. 24, 1998) in which the width, and the transmittance or reflectance, of a sheet of photographic material is determined by apparatus employing a plurality of optical sensor arrangements. The entire disclosure of this application is incorporated herein by this reference.

With reference to the photographic application of the invention, in a conventional photoprocessor, the sheet of photographic material is driven therethrough by rollers. The spacing from one roller, or set of rollers, to the next is arranged to be less than the length of the smallest sheet to be handled by the processor. Thus, the speed of a sheet through the processor can be controlled by means of a drive roller to be at a constant and known (or at least easily calculated) value. The length of the sheet can then easily be derived, for example, using microswitches as mentioned above. The processing apparatus will also have associated therewith an optical scanning apparatus for determining the integrated film transmittance, or reflectance, which, together with the film length and width is then used to control the replenishment of the film processor chemical solutions. The scanner may, in principle, be positioned anywhere in the processor, for example after the fixing stage. However, if the scanner is provided as a stand alone piece of apparatus and receives the photographic sheet subsequently to the sheet leaving the speed-controlled photoprocessor rollers, then the sheet will move freely, that is to say under its own weight, and accelerate from the photoprocessor as it passes through the scanning apparatus. In a preferred method of operation the scanning apparatus samples the light transmitted through the sheet at regular intervals. During the period of movement at constant speed, therefore, when the sheet is being driven through the scanning apparatus by the processor's drive roller, each transmittance sample value obtained will be associated with a constant area of material, equal to the width of the sheet multiplied by the distance moved by the sheet between samples. Towards the end of the passage of the sheet, however, measurements made whilst the sheet is accelerating should have a variable and increasing area of the sheet associated with them. It will be appreciated that errors will arise unless appropriate correction is made.

It is one object of the present invention to provide an inexpensive yet accurate method for measuring the transmittance, or reflectance, of a freely-moving sheet of photographic material.

SUMMARY OF THE INVENTION

In accordance with one aspect of the present invention, there is provided a method of determining as a function of time, the speed of movement of a sheet, which may be an image-bearing sheet, as it accelerates freely through a scanning region in which light is directed onto the sheet and is subsequently received by an optical sensor arrangement, at least part of the sheet having been driven through the scanning region at known substantially constant speed prior to commencement of the period of acceleration, the method comprising the steps of:

determining from the output of the sensor arrangement the final speed of the sheet at its exit from the scanning region;

determining from the final speed the acceleration with which the sheet has been accelerating through the scanning region, and deriving from the acceleration a function relating sheet speed to time before its exit from the scanning region.

The sheet is preferably one in which the trailing edge is of substantially constant optical transmission or reflection density over a length greater than and preferably at least twice, the extent of the scanning region in the direction of movement of the sheet.

The passage of the trailing edge of the sheet in the scanning region may be detected by monitoring the output of the sensor arrangement, and the said final speed may then be determined from stored values of the sensor arrangement during the passage.

The sensor arrangement may comprise two light sensitive elements offset in the direction of the movement of the sheet by a distance that is short with respect to the distance travelled by the sheet from the beginning of the period of acceleration to its exit from the scanning region. Alternatively, the sensor arrangement may comprise a single sensor, wherein the final speed of the sheet at its exit from the scanning region is determined by repeatedly sampling the output of the sensor at a time interval that is less than at least half the quotient of the length of the scanning region in the direction of transport of the sheet therethrough and the expected final speed.

Advantageously, the sensor arrangement may be used both to determine the final speed of the sheet and to measure the transmittance or reflectance of the image thereon as the sheet passes through the scanning region.

The sheet may comprise a sheet of photographic material that, prior to passing through the scanning region, is driven at said substantially constant speed through a photoprocessor.

The total integrated transmittance or reflectance of the portion of the sheet which passed through the scanning region during the period of acceleration may be determined from stored output values of the sensor arrangement and from the said function relating sheet speed to time.

In accordance with a preferred embodiment of the invention, there is provided a method of determining the integrated transmittance, or reflectance, of an image-bearing sheet of photographic material processed in a photoprocessor, wherein the sheet is initially driven through the photo processor, and wherein subsequent to a fixing stage of the processing the sheet accelerates freely through a scanning region in which light is directed onto the sheet and is subsequently received by an optical sensor that provides an output representative of the transmittance, or reflectance, of the sheet, the method comprising the steps of: determining the final speed of the sheet at its exit from the scanning region by repeatedly sampling the output of the sensor at a time interval that is very much less than the quotient of the length of the scanning region in the direction of transport of the sheet therethrough and the expected final speed; determining from the final speed the acceleration with which the sheet has been accelerating through the scanning region, and deriving from the acceleration a function relating sheet speed to time before its exit from the scanning region; determining the total integrated transmittance, or reflectance, of the portion of the sheet which passed through the scanning region during the period of acceleration from stored output values of the sensor arrangement and from the said function relating sheet speed to time.

Thus, in accordance with this embodiment of the present invention, the integrated transmittance, or reflectance, of the end portion of the sheet can be determined accurately, taking into account the fact that it is not travelling at a constant, known speed, and this correction can then be added to the transmittance of the remainder of the sheet, as measured under constant speed conditions.

The integrated transmittance or reflectance of the remaining area of the sheet is preferably derived from the output of the sensor arrangement, and this can advantageously be done, together with the sheet width measurement, as described in our above-referenced co-pending application.

When the sheet first passes into the scanner the leading edge is detected and the output of the sensor is subsequently scanned at regular intervals and stored in computer memory until the trailing edge of the sheet is detected. At this point, the final speed of the sheet, that is to say the speed of the trailing edge as it leaves the scanning region, is determined from preceding stored outputs of the sensor.

From the final speed of the sheet and the known distance over which the sheet has been accelerating, and by assuming a functional dependence for the acceleration with time, a value for the acceleration may be calculated. It is then possible to derive an expression for the speed of the sheet as a function of time elapsed from the start of the period of acceleration. The expression is then used to determine the area of the sheet associated with each of the stored transmittance values. With this information, the total integrated transmittance of the portion of the sheet scanned during acceleration is obtained.

This transmittance value can then be added to the transmittance value of the remaining portion of the sheet, as obtained by the optical sensor, when that sheet has been passing through the scanning region at constant speed under control of the drive rollers of the associated photoprocessor.

It will be appreciated that the sampling rate of the output of the sensor needs to be comparatively high, and this is determined in respect of the expected final speed of the sheet leaving the scanning region, which is determined by simple experiments. It will be appreciated that the acceleration the sheet undergoes and thus the speed with which the sheet leaves the scanning region, will depend upon several factors, including the length of the sheet, the distance from the last nip of the rollers of the photoprocessor to the scanning region, referred to as the drop-out length, and the weight and rigidity of the sheet.

To a first approximation, the acceleration of the sheet may be assumed to be constant through the scanning region. However, further accuracy of the expression relating sheet speed to time may be obtained by selecting a functional dependence of the acceleration with time which most closely approximates actual measurements e.g. of a calibration sheet with appropriate pattern or fiducial marks. Further enhancements may be made by making the acceleration profile functionally dependent on other parameters, such as the length of the sheet.

The invention also provides a method of replenishing at least one stage of a photoprocessor, wherein the amount of replenishment chemicals supplied to the said stage is in accordance with the integrated transmittance, or reflectance, of the image-bearing sheet of photographic material as measured in accordance with said one aspect of the invention.

Signals from the scanning apparatus may also be used in other aspects of control of the photoprocessor, for example in determining when various filters thereof need to be cleaned or replaced, and to control operation of a silver recovery unit.

The present invention thus allows the speed of the sheet to be determined whilst it is accelerating, in a particularly convenient manner.

Accordingly, the method of the present invention thus in particular allows the integrated transmittance, or reflectance, of an entire image bearing sheet, for example of photographic material, to be accurately obtained using an optical scanner of self-contained construction, since it can be provided as a stand-alone unit fitted for example retro-fitted, to the exit of the dryer of a conventional film processor. The scanning apparatus can furthermore be of comparatively low cost, since it does not require any drive rollers to be specifically associated therewith, since it simply receives the photographic sheet as driven out from the photoprocessor itself. Furthermore, the lack of need for any drive rollers allows for a more compact configuration with the optical scanner closely adjoining the dryer exit. Thus, the "footprint" of the total processing/scanning apparatus can be minimised and the time taken for the sheet to pass through the processor and drop-out is unchanged by the addition of the scanner.

Also, it will be appreciated that no data link to the host photoprocessor is needed in order for the scanning apparatus to determine the integrated transmittance of the entire sheet. This reduces the cost and complexity of retrofitting the scanner to a photoprocessor.

Furthermore, the increased accuracy of the measurement of the total integrated transmittance, or reflectance, of the whole sheet of photographic material compared to the case when proper compensation is not made for the period during which the sheet is accelerating can result in a refinement of the amount of replenishment chemicals needed during operation of the photoprocessor, with a consequent improvement in control of the photographic process and the potential for reduction in consumption of replenishment chemicals and in effluent produced.

The invention, however, is more generally applicable, and may be used, for example, in the scanning of electrophotographic images made with toner or printed images made with ink.

BRIEF DESCRIPTION OF THE DRAWINGS

A method of, and apparatus for, determining the integrated transmittance of an image-bearing sheet of photographic material processed in a photoprocessor employing speed determination in accordance with the present invention, will now be described, by way of example, with reference to the accompanying drawings, in which.

DETAILED DESCRIPTION OF THE INVENTION

Figure 1:
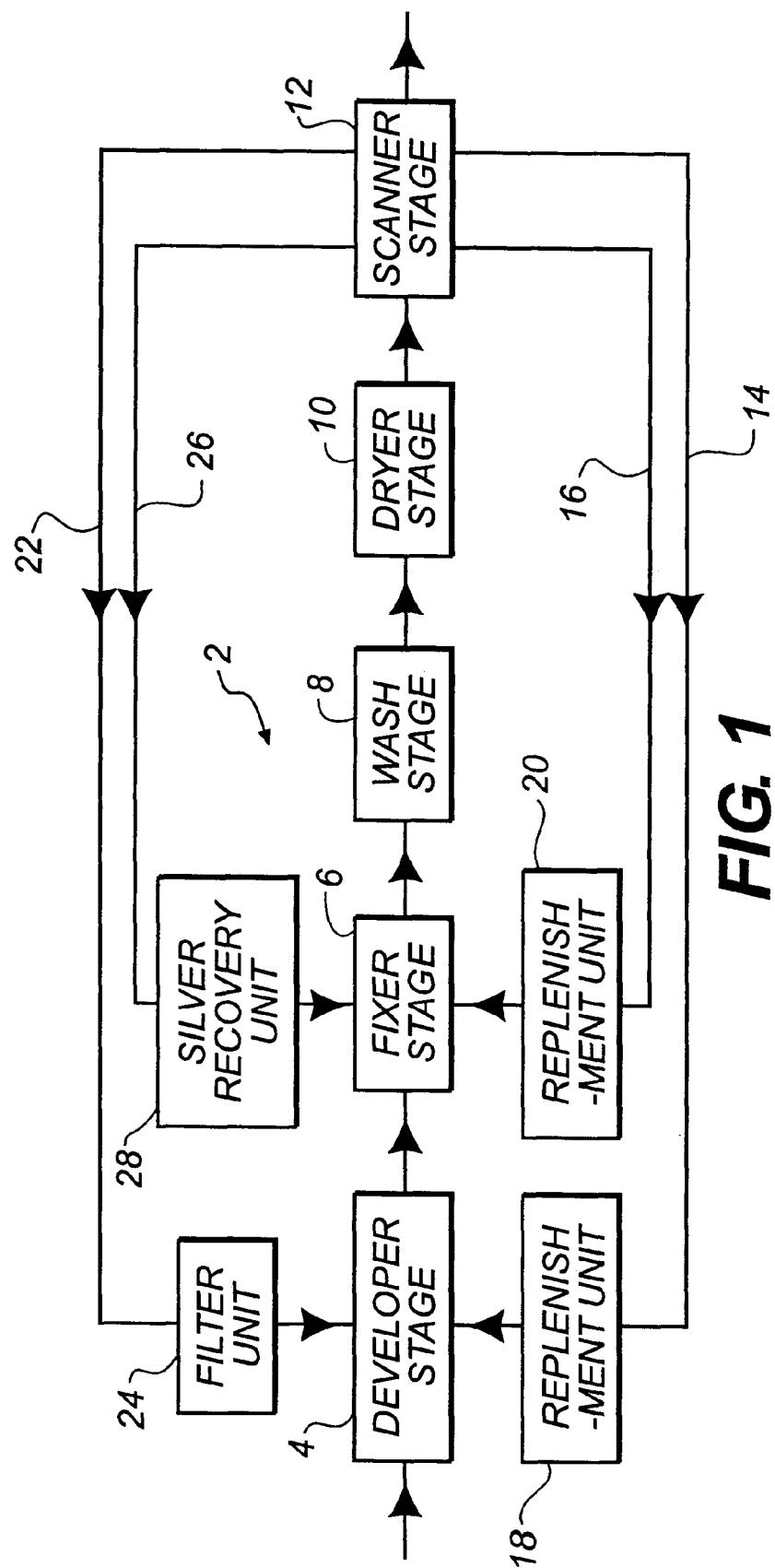
FIG. 1 is a schematic illustration of photographic processing apparatus.

Referring to FIG. 1, a conventional graphics art processor 2 of black and white discrete sheets of film (not shown) comprises sequential processing stages in which the film passes from a developer stage 4 through a fixer stage 6, then to a wash stage 8 and finally into a dryer stage 10. The sheets are driven through the photoprocessor by means of powered rollers. A separate scanner stage 12, to be described later in further detail, is mounted after the dryer stage 10. The area of film that has been processed is calculated from measurements obtained at the scanner stage, and signals are then fed back to control various operations of the processor 2. As shown, control signals are sent along lines 14 and 16 to respective replenishment units 18 and 20 to control the quantity of replenishment solution that is supplied to respective developer and fixer stages 4 and 6. A further control signal is sent along line 22 to control replacement of filters in a filter unit 24 that removes by-products from the developer stage 2. Yet another control signal is sent along line 26 to a silver recovery unit 28 that removes silver from the fixer stage 6.

Figure 2:
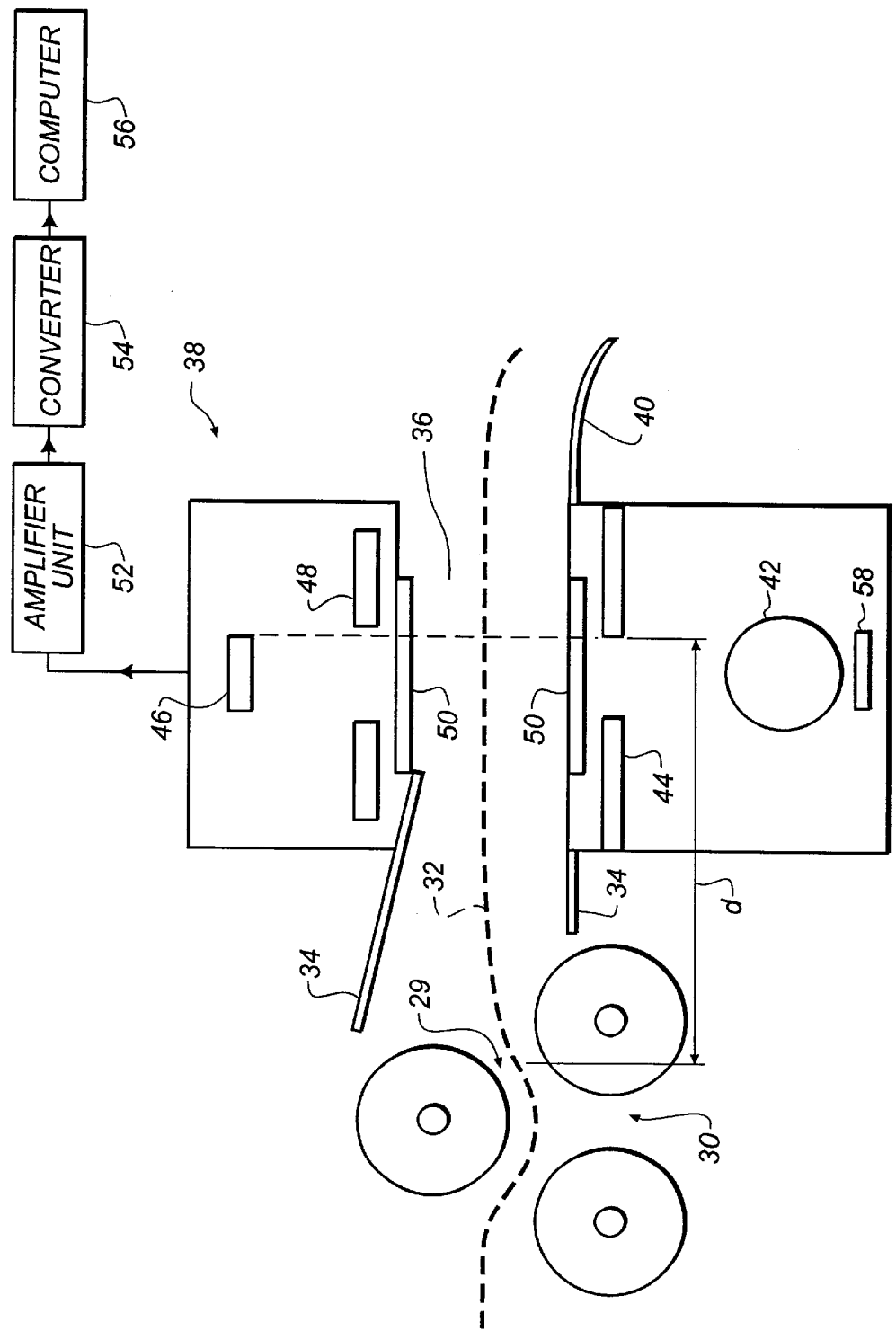
FIG. 2 is a schematic cross sectional elevation of a portion of the apparatus of FIG. 1.

The construction and operation of the scanner stage 12 will now be described with reference to FIG. 2. A sheet of film, which may be up to a maximum width of 550 mm, leaves the nip 29 of a driven exit roller arrangement 30 of the dryer stage 10 of the processor, and travels along a path 32 between entrance guides 34 into a channel 36 of a scanner 38. As the trailing edge of the sheet leaves the nip 29, the sheet exits the scanner 38 freely over a guide 40, and accelerates under its own weight. A fluorescent tube 42 is mounted below the channel 36 and light therefrom is directed upwards through an aperture plate 44. The aperture extends 590 mm transversely of the channel (i.e. perpendicular to the plane of the Figure) and 3 mm therealong in the direction of travel of the film. A light sensor 46 is mounted above the channel 36 and receives light that has travelled through the aperture plate 44 and across the film path 32. The sensor 46 extends 3 mm along the length of the channel 36 and is 610 mm wide. Provided the film enters the channel 36 of the scanner squarely, the width of the sensor 46 is not critical. However, since the sensor 46 is to be used to detect the leading and trailing edges of the film, the accuracy of the measurement will be improved by having a longer sensor, to ensure that the whole of the leading edge is in the aperture at one time. The amount of light falling on the sensor 46 is further defined by a sensor aperture plate 48 whose aperture is parallel to the aperture of the light source plate 44, that is of the same width but that has a slightly larger length of 5 mm. A pair of clear windows 50 physically close the apertures of the plates 44 and 48 on respective sides of the channel 36. The sensor 46 is provided by a length of solar cell strip.

The signals from the sensor 46, which represent the transmittance of the film, are passed to sample-and-hold amplifiers represented by the unit 52, and then to an analog-to-digital converter 54, where they are digitised for processing by a computer or by an embedded microcontroller 56. The software of the computer 56, together with an associated crystal-controlled clock, controls the frequency at which the signals from the sensor 46 are sampled. In order to improve the signal-to-noise ratio, many samples, hereinafter referred to as micro-samples, are taken at as rapid a rate as possible as defined by the hardware, and the results are averaged. For example, 30 samples may be taken at 300 microsecond intervals per sample. At the same time as the output from the sensor 46 is sampled, the output is sampled from a reference optical sensor 58, representing the output of the light source 42. All sampled values from the sensor 46 are divided by the sampled values of the reference sensor 58 to ensure that the effects of drift in the output of the lamp 42, and other systemic long term variations, are minimised. Furthermore, the sampling may be synchronised with the zero crossing of the mains voltage as measured from the tube 42 to eliminate any mains effect noise and mains-related light output variation of the tube from the readings. The procedure of acquiring a number of micro-samples and averaging them (to produce a datum hereinafter known as a scan) is repeated at precise intervals determined by the selected clock rate. Typically, for example, the timing may be arranged to accommodate at least two scans during the passage of any point on the film across the optical aperture of the scanner. During the bulk of the data acquisition, that is to say whilst the sheet is passing through the scanner at a constant speed under the driven control of the photoprocessor, the individual values of the micro-samples are of no interest. The micro-sample data is required, however, in order to analyse the leading and trailing edge profiles of the transmittance of the sheet. Consequently, throughout the scanning process the micro sample data for the five most recent scans is stored, and is constantly replaced on a first-in, first-out basis until it is required as set out below for further analysis. The five most recent scans are stored in a scan register of the computer 56. The number of scans, in this example 5, is chosen to ensure that the drop-out period will always be less than the time taken for that number of scans even under the conditions which will produce the longest drop-out period.

Figure 3:
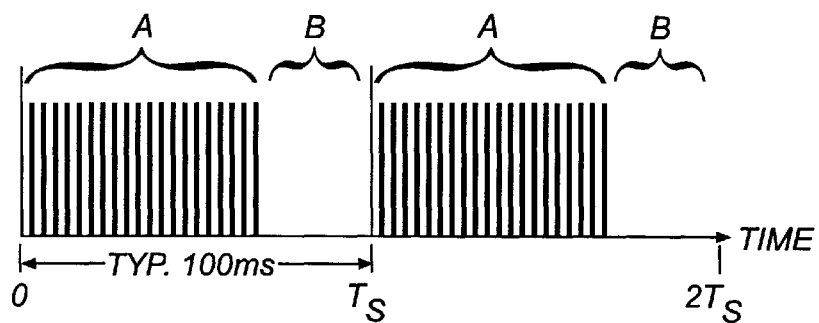
FIGS. 3 to 7 are graphs useful in explaining the method of measuring the transmittance.

Reference is now made to FIG. 3 to explain the relationship between micro samples and the scan period, by way of example. A clock pulse at time zero starts scanning, with a time period of $T_s$, and two such scan periods are shown. The exemplified scan period $T_s$ is 100 milliseconds, but may usefully be chosen to be any multiple of the mains electricity half-period. The clock pulse also triggers the beginning of the micro-sampling, and the group A in each scan period corresponds to approximately 300 of these. The processing of the data from the micro samples may be done in parallel, or may be carried out in the "free" periods B of each scan. The length of the time period B for data processing is a function of the hardware used to acquire the data, and is preferably as short as possible. It is to be emphasised that the averaging of micro samples is done to reduce the amount of data stored and to reduce the amplitude of noise sources in the scan data.

For a 3 mm optical aperture of the scanner, in association with a typical transport speed of the sheet through the photoprocessor of about 1 m/min, a scan period of 100 milliseconds corresponds to a distance of film movement of approximately 1.67 mm, thus satisfying the preferred requirement of two scans during the passage of a point on the film across the 3 mm scanner aperture.

In operation, the computer 56 constantly monitors the open gate transmissivity as detected by the sensor 46, that is to say in the absence of any sheet in the channel 36. The most recent ten scan results are stored in the computer 56. Detection of a change of transmissivity greater than a predetermined noise threshold is understood as being the sensing of the leading edge of the sheet. The earliest of the 10 stored open gate values is then retained, as a reliable measurement of the open gate transmissivity, which may then be used in the determination of the width of the sheet, for example as set out in our above-referenced co-pending patent application.

Figure 4:
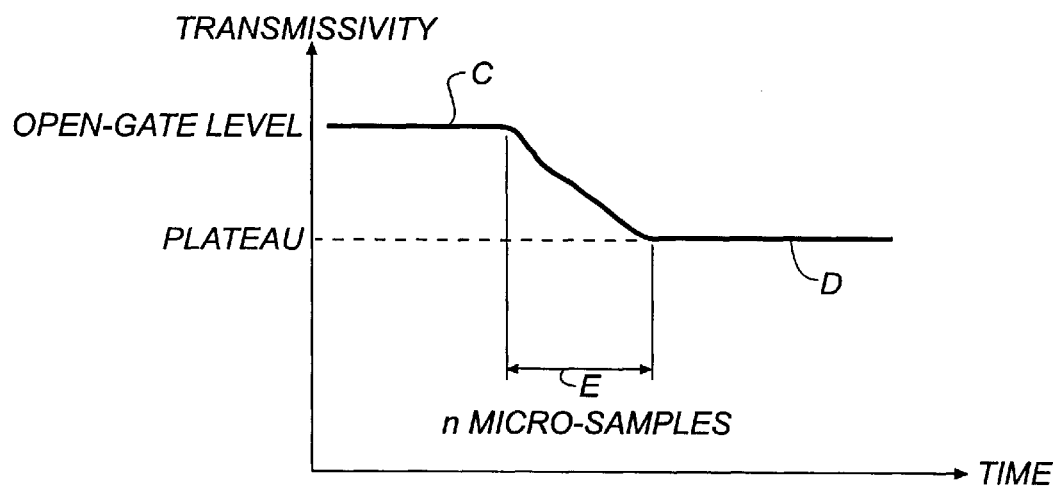

FIG. 4 indicates the transmissivity, as indicated by the sensor 46, with respect to time as the leading edge of a sheet passes through the optical aperture of the scanner. The data in the micro sample register of the computer 56 is analysed when the leading edge of the sheet is detected, and the profile of the transmissivity at this point can be used to obtain the film transport speed, which is later required for the black data i.e. integrated film transmittance, calculations. Alternatively, the film transport speed may be obtained from sensors, for example microswitches, associated with the processor, since the speed of the leading edge of the sheet is that of the drive of the photoprocessor, which is still controlling the movement of the sheet as it enters the scanner. However, in general the film transport speed is found to be very small compared with the final exit speed as the sheet freely falls out of the scanner, and can accordingly be approximated to zero in the subsequent calculations. For optimum accuracy though, the actual transport speed can be determined from the time taken by the leading edge of the sheet to pass across the known dimension of the scanner aperture, in this case 3 mm. The time may be determined by the number of micro-samples made during period E between the initial open gate level C and the final plateau level D. The plateau level D arises because for example with high-contrast black-and-white graphic arts film, there is normally at least 10 mm border of uniform transmittance (i.e. clear or black) at the leading and trailing edges of the sheet. The computer 56 calculates the number n of micro-samples from the sensor 46 noted during the intermediate sloping portion E of the graph. As an example, n=540. Since each micro sample is known to last for 300 microseconds, and the width of the optical aperture of the scanner is known to be 3 mm, then the transport speed is given by:

$$\frac{3 \times 60}{540 \times 0.3} = 1.11 \text{ meters per minute}$$

Figure 5:
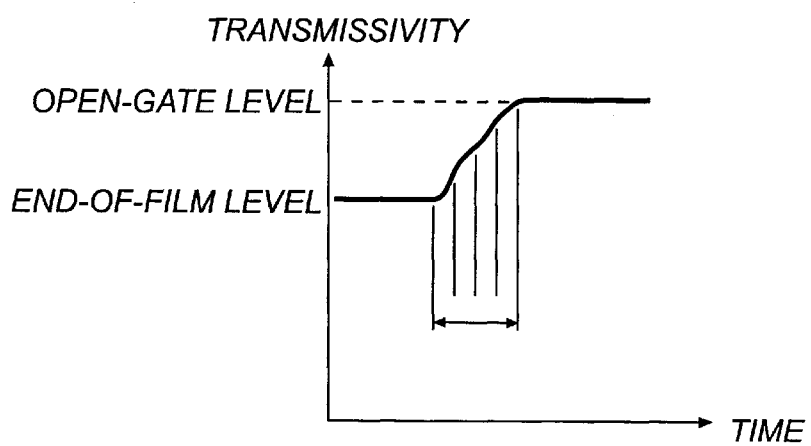

During the passage of the bulk of the film, that is to say that portion following the leading edge with its associated constant transmittance (the lower plateau D of FIG. 4) and before the trailing edge of the sheet, the transmissivity values obtained from the sensor 46 and the computer 56 from each scan are integrated to obtain the transmittance for that bulk part of the sheet. The micro sample data from the five most recent scans are stored in the memory, and is constantly overwritten until the open gate value is again recognized, indicating that the end of the film has been detected. At this point, analysis of the micro-sample register will reveal a transmissivity profile of the trailing edge, from which the final speed of the sheet as it drops from the scanner can be obtained. This profile is shown in FIG. 5, whereby the transmissivity is seen to rise from an end of film plateau level and to return to the higher open gate level after the sheet has completely left the scanning region.

If the film does not have a region of uniform optical density at its trailing edge, the profile of the trailing edge will not show a plateau region. To determine the film speed at its exit from the scanner an auxiliary sensor will be necessary. If the image-bearing sheet is for transmission viewing, such as film, then a reflection sensor would be provided on the same side of the sheet as the light source, positioned to receive reflected light from the sheet as it passed through the scanning region and produce a high output value. With no film in the scanner, no light would be reflected and the output value of the auxiliary sensor would be low. AS the trailing edge of the film passed through the scanner, regardless of the transmittance profile, the auxiliary sensor would exhibit a transition from high to low, the speed of which would enable the film speed at exit to be determined.

For sheet media viewed in reflection, such as paper or printing plates, the auxiliary sensor would be positioned on the opposite side of the sheet from the light source. With the sheet in the scanner gate, the output of the sensor would be low since little or no light would pass through the sheet. As the trailing edge passed through the scanner, the output value would exhibit a transition from low to high, the rate of change of which would enable the exit speed of the sheet to be determined.

Since the auxiliary sensor would add extra cost to the scanner, the preferred embodiment uses sheets with uniform trailing edge profiles and uses the main sensor scan information both to measure transmittance or reflectance of the sheet as well as to determine the exit speed.

The processor's film transport speed may be approximated to zero in most practical instances. But even if it is taken as the calculated value, the acceleration of the sheet as it falls freely out of the scanning region can be determined. It will be appreciated that the distance d (FIG. 2), referred to as the "drop-out distance", from the nip 29 of the dryer rollers 30 to the end of the optical aperture of the scanning region, is fixed and known. The first task in the procedure of drop-out compensation, that is to say in the determination of the integrated transmittance of that portion of the sheet measured during acceleration, is to determine the final speed of the sheet as it leaves the scanner. Using this information together with the drop-out distance and an assumed acceleration profile for the drop-out period, the acceleration is determined. Finally an expression is derived relating the speed of the sheet to the elapsed time since the start of the period of acceleration. This latter expression is used to determine the length of the sheet that should be associated with the scan data stored during the drop-out period. Thus, the drop-out compensation of the stored scan data may be performed.

Figure 6:
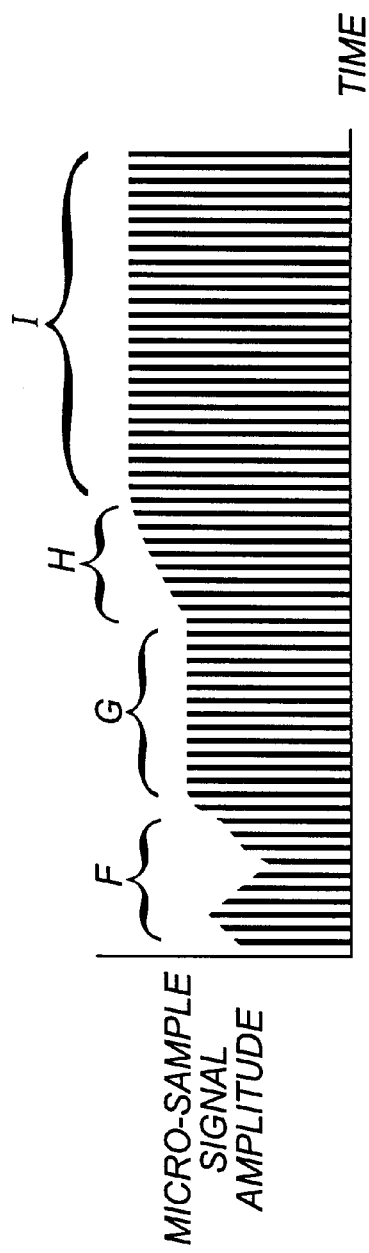

An example of the analysis of the output from the optical sensor 46 during the final stages of travel of the sheet of photographic material through the scanning region, will now be described by way of example with reference to FIG. 6 which shows typical micro sample data obtained from the sensor 46 as the photographic sheet undergoes the transition from movement under a controlled transport speed from the photoprocessor, through acceleration as it drops out of the scanning apparatus. The first group of micro samples F represents the scanning of the portion of the film bearing the image just after the period of acceleration has begun. The following group of microsamples G indicates constant transmittance over a short distance, and corresponds, in this example to the clear portion of the trailing edge of the sheet as it crosses the optical aperture. As the sheet drops out of the scanning apparatus, a small number of micro-samples, group H, form a ramp as the trailing edge of the sheet crosses the optical aperture. The final group of micro samples I represents the open gate value of the scanning apparatus when there is no sheet in the aperture. The micro-samples throughout are evenly-spaced at 300 microsecond intervals in this example. The time elapsed during the ramp section H is determined by the final velocity of the sheet as it drops out of the scanning apparatus. In this example, it can be seen that there are eight micro-samples in the Group H representing the final drop-out of the sheet. At 300 microseconds per sample, accordingly, this represents a time of:

$$8 \times 300 \, \mu s = 2.4 \, ms$$

that the sheet took to cross the length of the scanning aperture, namely 3 mm. Thus, the final velocity is given by:

$$V_f = 0.003/0.0024 = 1.25 \, m/s.$$

The distance d from the nip 29 of the last set of driven rollers 30 of the photoprocessor to the optical aperture is fixed, and in this example equal to 80 mm. It will be appreciated, that since the shortest typical length of a sheet of photographic material is about 315 mm, this so called "drop-out" distance can give rise to the need for a significant correction. Since the photoprocessor transport speed is typically of the order of 1 m/min, as shown above, it will be appreciated that this is small compared with the final velocity at drop-out, as exemplified here as 1.25 m/s. Accordingly, the speed of the sheet at the start of the ramp of the group H of micro-samples can be approximated to zero in comparison with the speed at the end of that ramp. Thus, it will be appreciated that it can now be approximated that the sheet has accelerated from zero to 1.25 m/s in a distance of 80 mm. For the purpose of the exemplified analysis, the assumption is made that the acceleration of the film during the "drop-out" period is constant. Accordingly, the following equation of motion can be used:

$$V^2 = U^2 + 2AS,$$

where V=final speed, U=transport speed (approximated to zero), A=acceleration and S=distance.

Inserting the numerical values from above, the acceleration is calculated as 9.76 m/s².

Using the equation of motion:

$$V = U + AT,$$

where T=elapsed time since the start of the period of acceleration, it is calculated that the time taken for the sheet to accelerate until it finally drops out of the scanning apparatus is 128 ms. This is the time period during which the micro-samples representing the measured transmittance of the accelerating sheet have to be examined in order to calculate the compensation to the measured total transmittance.

If the sheet were first detected, i.e. at its leading edge, by the sensor 46 of the scanning apparatus at time $T_0$ and the trailing edge were detected at time $T_1$, then, in the present example, the sheet would have commenced its drop, that is to say exited the nip 29 of the roller arrangement 30, at a time ($T_1$ − 128) milliseconds. Accordingly, the total length of the sheet would be:

$$80 + \text{film transport speed} \times (T_1 - T_0 - 128).$$

As far as compensation for the total transmittance measured during the dropout distance is concerned, it will be seen that, as exemplified, at a sample interval of 300 µs, 128 ms would represent:

$$128/0.3 = 427 \text{ micro-samples}.$$

Accordingly, the last 427 micro-samples have to be analysed in order to obtain the black data, i.e. the integrated film transmittance from the drop-out period.

Figure 7:
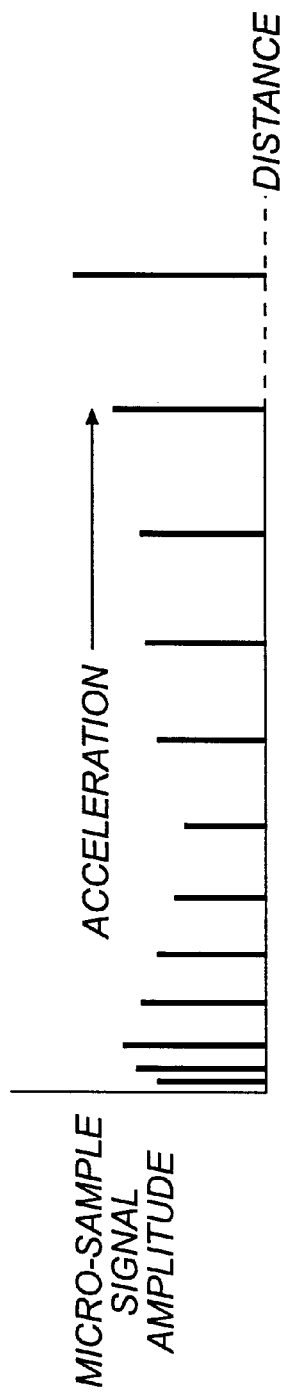

FIG. 7 is a plot of a micro sample signal amplitude against distance, and shows how each successive sample represents a larger area of the film during the accelerating drop-out period, when the transmittance is being measured of the end of the image-bearing portion of the sheet and its trailing edge.

From the basic equations of motion under constant acceleration, the distance travelled during each sample can easily be calculated. Let N=number of samples to be back-calculated, $L_i$=calculated distance travelled during the $i^{th}$ micro-sample, $b_i$=calculated effective black width for micro-sample i (i.e. derived from a single transmittance microscan as measured by the sensor 46). For details of the calculation of effective black width, see the derivation of equation 8) in the co-pending patent. Thus, the black area for the region of sheet that is subject to the accelerating drop out is given by:

$$\sum_{i=1}^{N} b_i \cdot L_i$$

We may use the equation of motion:

$$V_i = U + A \cdot T_i$$

To determine $V_i$, which is the speed of the sheet at the time, $T_i$, from the start of the period of acceleration when the $i^{th}$ microsample was measured, where U is the processor transport speed and A is the previously determined value of the assumed constant acceleration.

If $\Delta T$ is micro-sample time interval, and we make the assumption that the sheet speed is constant during the sampling of the $i^{th}$ microsample, we may write a simple expression for $L_i$, $$L_i = V_i \cdot \Delta T$$

which may be substituted for $V_i$ to give $$L_i = U + A \cdot T_i \cdot \Delta T$$
$$= U + A \cdot i \cdot \Delta T^2$$

Substituting this expression into the equation above for the black area, one obtains for the area of the sheet subjected to acceleration:

$$\text{Black\_area} = \sum_{i=1}^{N} b_i \cdot (U + i \cdot A \cdot \Delta T^2)$$

It will be appreciated that the total black area for the entire sheet, that is to say taking into account also the correctly-determined black areas from the sensor output whilst the sheet passes thereunder at controlled transport speed, is the sum of all the stored areas in the computer 56. Accordingly, this total value together with the sheet area can then be used to determine the amount of replenishment that is required for the associated photoprocessor.

The invention has been described in detail with particular reference to preferred embodiments thereof, but it will be understood that variations and modifications can be effected within the spirit and scope of the invention as set forth in the claims.

PARTS LIST 2 processor
4 developer stage
6 fixer stage
8 wash stage
10 dryer stage
12 scanner stage
14 line
16 line
18 replenishment unit
20 replenishment unit
22 line
24 filter unit
26 line
28 filter recovery unit
29 nip of roller arrangement
30 roller arrangement
32 path
34 entrance guide
36 channel
38 scanner
42 fluorescent tube
44 aperture plate
46 sensor
48 aperture plate
50 window
52 unit
54 analogue to digital converter
56 computer
58 sensor

What is claimed is:

1. A method of determining as a function of time, a speed of movement of a sheet as it accelerates freely through a scanning region in which light is directed onto the sheet and is subsequently received by an optical sensor arrangement, at least a part of the sheet having been driven through the scanning region at known substantially constant speed prior to commencement of a period of acceleration, the method comprising the steps of:

sampling data received by the sensor arrangement at evenly spaced predetermined intervals to form an output;

determining from the output of the sensor arrangement a final speed of the sheet at its exit from the scanning region;

determining from the final speed an acceleration with which the sheet has been accelerating through the scanning region, and deriving from the acceleration a function relating sheet speed to time before its exit from the scanning region.

2. A method according to claim 1, wherein passage of the trailing edge of the sheet in the scanning region is detected by monitoring the output of the sensor arrangement, and wherein the said final speed is determined from stored output values of the sensor arrangement during the passage.

3. A method according to claim 1 wherein the trailing edge of the sheet is of substantially constant optical transmission or reflection density over a length greater than, and preferably at least twice the extent of the scanning region in the direction of movement of the sheet.

4. A method according to claim 3, wherein the sensor arrangement comprises a single sensor, and wherein the final speed of the sheet at its exit from the scanning region is determined by repeatedly sampling the output of the sensor at a time interval that is less than the quotient of the length of the scanning region in the direction of transport of the sheet therethrough and the expected final speed.

5. A method according to claim 1, wherein the sensor arrangement comprises two light sensitive elements offset in the direction of the movement of the sheet by a distance that is short with respect to the distance travelled by the sheet from the beginning of the period of acceleration to its exit from the scanning region.

6. A method according to claim 1, wherein the sensor arrangement is used both to determine the final speed of the sheet and to measure the transmittance or reflectance of the image thereon as the sheet passes through the scanning region.

7. A method according to claim 1, wherein the acceleration of the sheet through the scanning region is taken to be constant.

8. A method according to claim 1, wherein the sheet comprises a sheet of photographic material, and wherein prior to passing through the scanning region the sheet is driven at said substantially constant speed through a photoprocessor.

9. A method according to claim 1, wherein a total integrated transmittance or reflectance of the portion of the sheet which passed through the scanning region during the period of acceleration is determined from stored output values of the sensor arrangement and from the said function relating sheet speed to time.

10. A method of replenishing at least one stage of a photoprocessor through which the sheet, which is an image-bearing sheet, has been processed and which is situated adjacent to the scanning region, wherein the amount of replenishment chemicals supplied to the said stage is dependent on the integrated transmittance, or reflectance, of the image-bearing sheet as measured by the method according to claim 9.

* * * * *